Patented June 17, 1952

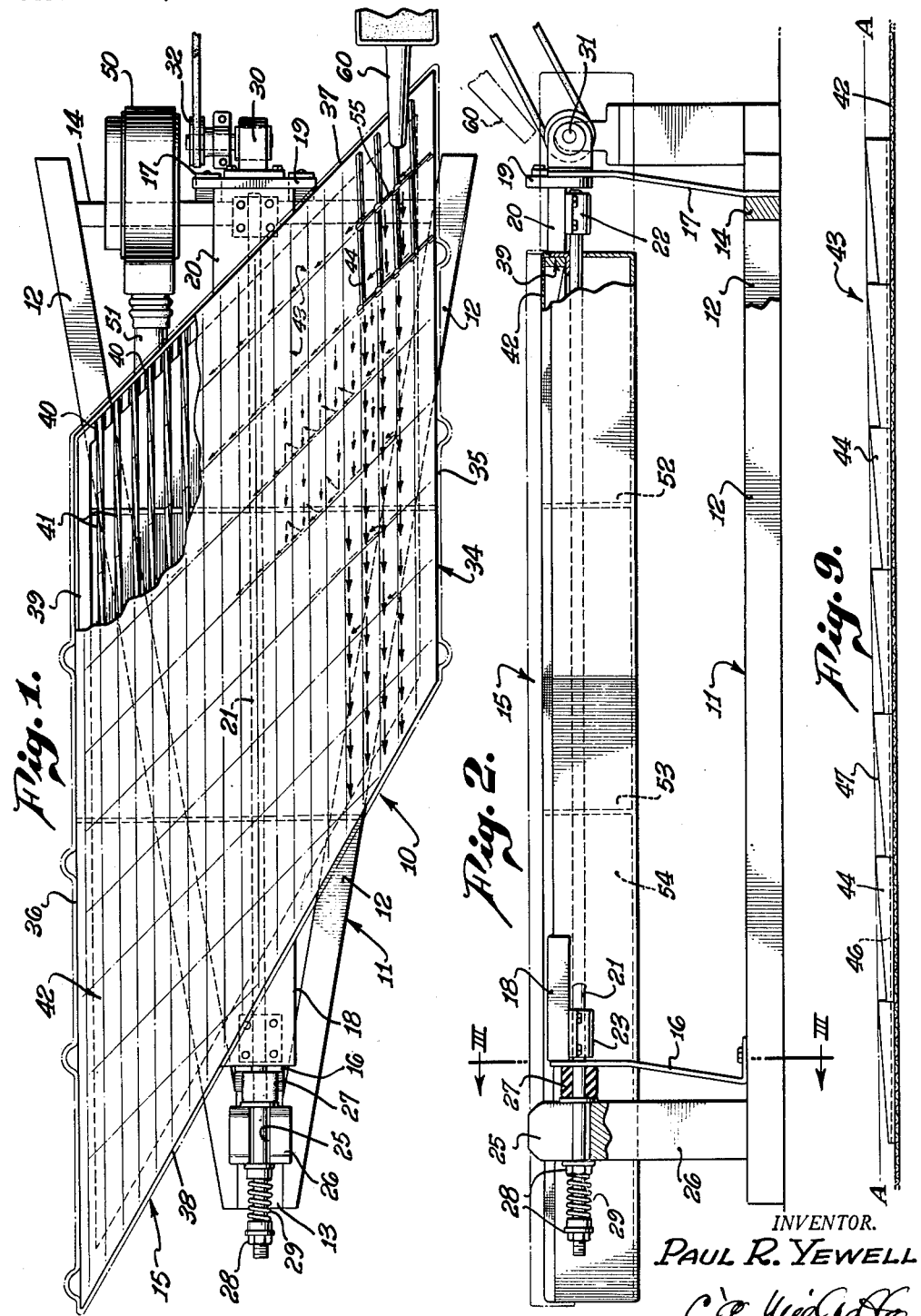

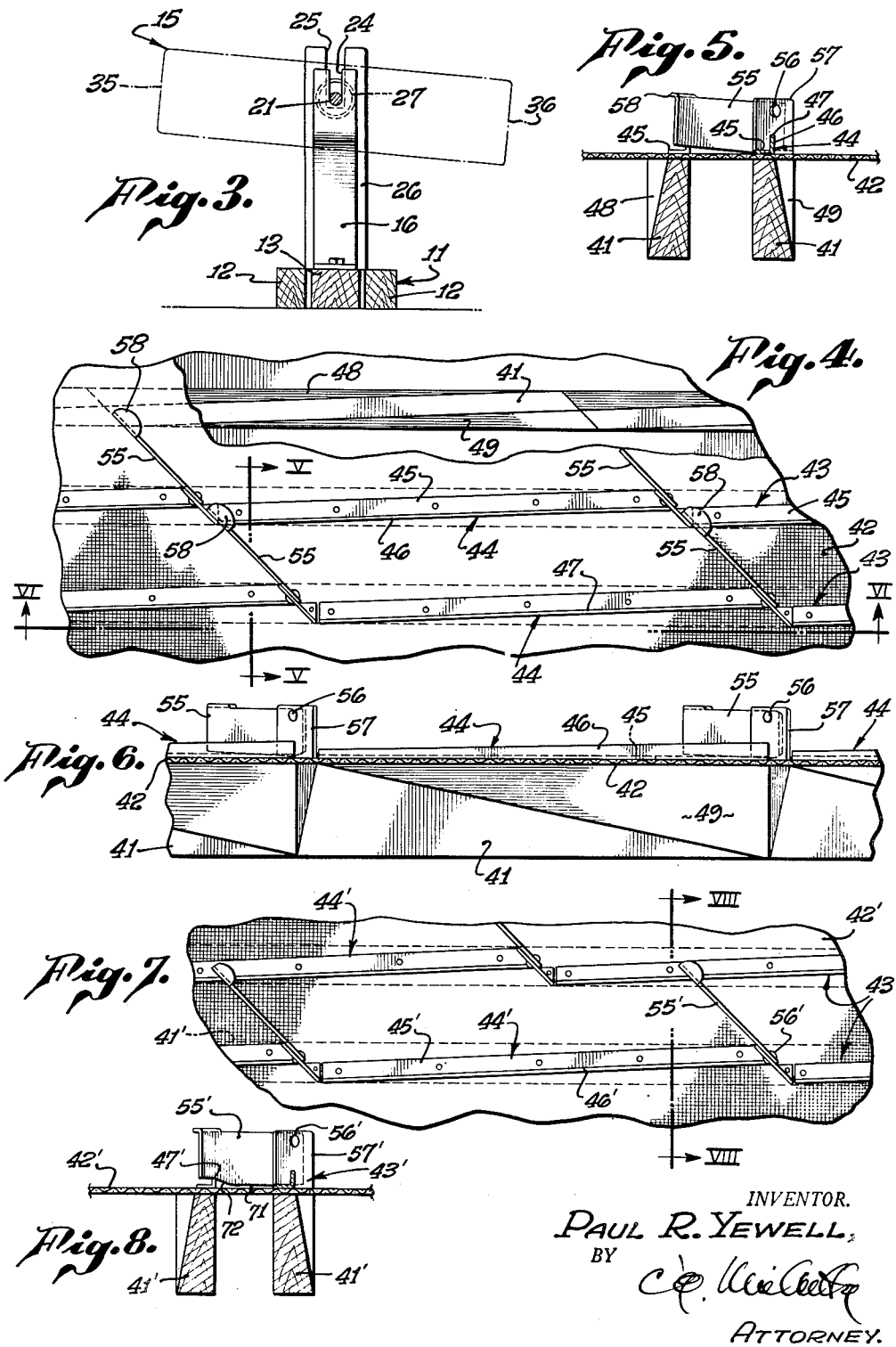

2,600,600

UNITED STATES PATENT OFFICE 2,600,600

MINERAL SEPARATING APPARATUS

Paul R. Yewell, Tucson, Ariz.

Application June 9, 1949, Serial No. 97,960

22 Claims. (Cl. 209—480)

This invention relates to improvements in apparatus for and method of separating valuable mineral from gangue or waste mineral, where the valuable mineral and waste in the particles of crushed ore being treated have different characteristics such as different specific gravities.

In the separation of valuable minerals from crushed ore, commercial separation is economically feasible only when the value of the mineral recovered exceeds the costs of separating the mineral from the ore and where the excess in value is of sufficient incentive for commercial undertaking. Generally, in mining for valuable minerals, rich veins containing high percentages of valuable mineral are processed until the amount of recovery of the valuable mineral makes further processing uneconomical. Usually when this point is reached in the process, the discarded ore still contains a substantial quantity of valuable mineral.

When strata of low quality ore are found, commercial processing is usually not undertaken because the amount of recovery by existing known methods of separating the valuable mineral from the ore will not make the undertaking a profitable one. Large quantities of valuable mineral are thus left in the earth and are not made available to industry.

When there is an ample and adequate supply of water or where water may be transported to an area without great expense it is normally desirable to use a method of separating the valuable mineral from the ore by means of various concentrating methods utilizing water. In general, methods of separating valuable mineral by use of water are efficient and effective. In arid regions where little or no water is available for use in separating minerals by use of water are efficient and effective. In arid regions where little or no water is available for use in separating minerals or where the cost of making a water supply available is exorbitant, other various methods for separating valuable mineral from ore have been proposed using a fluid as air in connection with the separating process. These prior proposed dry methods have been inefficient so that the recovery of valuable mineral from ore located in arid regions is generally not feasible.

This invention contemplates an improved apparatus for and method of separating valuable mineral from crushed ore which utilizes low pressure air in connection with the separation process and which is extremely efficient and capable of recovering a maximum percentage of valuable mineral from low quality ore.

While this new and improved method of separating mineral may be used with water, it preferably utilizes air whereby recovery of valuable minerals may be made in arid regions.

Another object of this invention is to provide an apparatus for separating valuable mineral from ore wherein the separation of the valuable particles of mineral from the particles of waste is accelerated and is very complete.

Another object of this invention is to provide a device and method as described above wherein a novel form of concentrating table is provided with riffle means extending longitudinally of the table, each riffle means comprising a plurality of individual separate tapered riffle segments for repetitively and continually separating the valuable particles of mineral from the waste particles.

A further object of this invention is to provide a concentrating or separating table as above described wherein gate means are provided for permitting passage of controlled amounts of valuable particles of mineral along the riffle means.

Still another object of this invention is to provide a concentrating table of the character described above wherein relatively high obstructions or gate means extend between the riffle means for repetitively obstructing and diverting the path of travel of waste particles of ore into a desired direction different from the path of travel of particles of valuable mineral.

A further object of this invention is to provide a concentrating table wherein the arrangement of the riffle means and in particular of the independent riffle segments is related to the characteristics of the mineral and ore being processed in order to obtain a maximum separation of the valuable mineral from the waste particles.

Generally speaking, this invention contemplates the separation of particles of valuable mineral from waste particles by a simple, efficient method which gives maximum recovery of the valuable mineral available in the crushed ore. In the invention crushed ore of predetermined grade and screening is fed to an inclined concentrating or separating table adapted to be longitudinally agitated by an eccentric pulley or other suitable means. The separation is accomplished by the provision of a plurality of longitudinally extending riffle means each comprising separate tapered obliquely offset riffle segments for the successive and repeated division of the particles of valuable mineral from the particles of waste. In addition to the tapered riffle segments, adjustable gate means are provided which extend between adjacent riffle means for obstructing the normal path of travel of the particles of crushed ore in order to build up at the gate means quantities of lighter particles which are then diverted in a direction transversely to their normal imparted path of travel. A current of air from underneath the concentrating table and directed upwardly through the mass of crushed particles acts to fluff the particles thus causing additional separation of the lighter particles from the heavier particles. In the process of separation the gate means are adjusted so that the heavier or more valuable particles of mineral generally pass beneath the gate means along the riffle means while the lighter particles of waste ride up over the tapered riffle segments and are urged in a direction different from the normal direction of the heavier particles.

Various arrangements of the tapered riffle segments and adjustable gate means may be made in accordance with the particular kind and size of crushed ore and valuable mineral being processed.

Other objects and advantages of this invention will become readily apparent to those skilled in the art from the following description of the drawings.

In the drawings:

Fig. 1 is a top plan view of a concentrating or separating apparatus embodying this invention.

Fig. 2 is a side view of the separating apparatus shown in Fig. 1.

Fig. 3 is a diagrammatic view of the foot or discharge end of the separating apparatus shown in Fig. 2 as viewed from a vertical plane indicated by the line 3—3 of Fig. 2.

Fig. 4 is a fragmentary enlarged top view of a section of the table or deck shown in a separating apparatus of Fig. 1.

Fig. 5 is a fragmentary enlarged view taken in a vertical plane indicated by the line 5—5 of Fig. 4.

Fig. 6 is a fragmentary enlarged view of the section of the concentrating table shown in Fig. 4 as viewed from the vertical plane indicated by the line 6—6 of Fig. 4.

Fig. 7 is a fragmentary enlarged plan view of a concentrating table illustrating a different modification of the riffle means arrangement.

Fig. 8 is a fragmentary enlarged sectional view taken in the vertical plane indicated by the line VIII—VIII of Fig. 7.

Fig. 9 is an enlarged diagrammatic view showing the longitudinal arrangement of the riffle means used in the concentrating apparatus shown in Fig. 1.

Referring particularly to Fig. 1 the separating or concentrating apparatus generally indicated at 10 comprises a generally triangular base indicated in its entirety by 11. The base 11 may comprise diagonally arranged side base members 12 joined at the apex of the triangle by a filler member 13 and joined at the base of the triangle by a transverse member 14. The base members 12 and 14 may be of any suitable structural material, such as wood timbers or metal structural shapes.

The concentrating table generally indicated at 15 is supported from the base 11 by a generally upstanding leg 16 at the foot or discharge end of the table and by a pair of spaced upstanding legs 17 at the head or material-introducing end of the table. The legs 16 and 17 may be secured to the base 11 in any suitable manner.

Each leg 16 and 17 may be made of wood, laminated wood, coil spring or, as shown here, each leg may comprise a suitable length of strap-like spring metal having an inclined portion canted toward the head end of the table for providing a slight lifting or upwardly directed motion of the table in operation as described in detail hereinafter. The uper end of leg 16 is secured to a triangular block 18 fitted on the table 15 intermediate the sides of the table. At their upper ends legs 17 may be secured in any suitable manner to a headboard 19 which is fixedly attached to the head end of the table intermediate its sides by a trapezoidal block 20.

The concentrating table 15 is rigidly attached in any suitable manner to a longitudinally axially extending rod 21 secured at one end to the block 20 by means of a bracket 22. Adjacent its other end the rod 21 is secured to the discharge end of the table by bracket 23. The latter end of the rod 21 extends through a vertical slot 24 in the upper end of leg 16 and through a correspondingly aligned slot 25 formed in the upper end of an upstanding bumper post 26. The lower end of the bumper post 26 is secured in any suitable manner to the filler block 13 and to the adjacent ends of the side members 12.

Interposed between the upper end of leg 16 and the bumper post 26 is a cushioning block 27 made of any suitable rubber or resilient material for a purpose described in detail hereinafter. On the opposite side of the bumper post 26 the rod 21 projects outwardly for threaded engagement with spaced nuts 28 having interposed therebetween a coil spring 29. The nuts 28 may be adjusted to vary the amount of compression on the coil spring 29 for modifying the length of stroke for agitation of the concentrating table as explained in detail hereinafter.

The headboard 19 is provided with a suitable adjustable connection (not shown) to an eccentric arm 30 for permitting the cencentrating table 15 to be tilted to a desired angle about the longitudinal axial rod 21 while still maintaining eccentric connection as indiated at 31 with a pulley 32. The pulley 32 is connected by usual belt means to a drive pulley driven by a motor or other driving means not shown. The eccentric connection 31 between the pulley 32 and the eccentric arm 30 provides for reciprocal longitudinal movement of the concentrating table 15 along its longitudinal axis.

For the purposes of clarity the concentrating table 15 shown in Fig. 1 illustrates longitudinally extending parallel riffle means and transversely extending parallel gate means which are relatively widely spaced and in which complete details of the gate means and riffle means on the table have not been brought out because of their relatively small size with respect to the entire area of the table. The spacing between the transversely extending gate means may be, for example, approximately 6" or about the length of a riffle segment, and the spacing between the riffle means may be approximately 1¼". These dimensions are exemplary only and may be varied in practice. The upper right-hand corner of the concentrating table has been broken away to show the arrangement of beveled riffle support members included in the concentrating table 15 as more particularly described hereinafter.

The concentrating table 15 comprises an outer metal frame 34 preferably made of angle iron members having one leg of the angle directed inwardly to afford a supporting flange. The table 15 is preferably made of trapezoidal shape having upper and lower sides 35 and 36 (when the table is in inclined position) disposed in virtually parallel relationship. The head end 37 of the table may form a suitable angle, as approximately 45°, with the parallel sides 35 and 36. The discharge end 38 of the table may be disposed at a suitable angle of approximately 60° with the discharge end of the lower side 36 and is disposed so that the lower side 36 is substantially longer than the upper side 35, for providing longer travel to particles along "tailings" discharge side of the table.

Carried within the metal frame generally indicated at 34 and supported on the inwardly extending flange of the angle iron members may be a removable wooden frame generally indicated at 39. The wooden frame 39 comprises suitable side members and head and foot members for mounting on the flanges of the members 35, 36, 37 and 38. The wooden frame members carried by the head member 37 and the foot member 38 are provided with a plurality of spaced slots 40 for receiving and supporting ends of riffle support members 41 which extend longitudinally of the table from head end to the foot end.

Extending and stretched across the entire wooden frame and riffle support members 41 is a sheet of fabric material 42 such as muslin which is relatively pervious to the passage of air therethrough. It will be readily noted that the riffle support members 41 and the side members of the wooden frame support the fabric 42 with a minimum of sagging between the riffle support members.

Longitudinally extending spaced riffle means 43 extend the length of the frame and each riffle means 43 comprises a plurality of riffle segments 44 which may be independently and separately mounted on the riffle support members 41 in a slightly echelon tandem or obliquely offset arrangement. Each riffle segment 44 may be made of an elongated tapered sheet of material, such as a plastic, or relatively thin metal and may be bent along a longitudinal line for providing a securing portion 45 of relatively uniform width throughout its length for nailing to the riffle support member 41 through the fabric 42 and an upstanding vertical portion 46 which has an upper edge 47 tapering toward the discharge end of the table.

In general, the over-all height of each riffle means 43 diminishes from the head end of the table towards the discharge end of the table, as shown by line A—A in Fig. 9. At the head end of the table the maximum height of the head end of a riffle segment 44 may be approximately $\frac{3}{8}''$ and may taper to $\frac{1}{4}''$ at the foot end of the segment. The height of the riffle segments diminish and vary toward the discharge end of the table so that the last riffle segment 44 immediately adjacent the discharge end of the table may include a tapered section having a top height of $\frac{1}{16}''$ which diminishes to approximately the thickness of the metal at the small end adjacent the discharge end of the table. It will be noted that the taper of the top edge of each segment 44 forms an angle with the plane of the table or deck of greater degree than that formed by line A—A. The top height and variation in height of the individual tapered riffle segments extending along the length of one riffle means is preferably modified according to the characteristics of crushed ore being processed, the tapered arrangement of the segments within a riffle means being correlated to the characteristics of the valuable mineral and gangue particles being processed.

For example, the taper of segments 44 in a riffle means 43 for one type of crushed ore may be such that the top edges of the riffle segments 44 lie in substantially parallel planes disposed at virtually the same angle with the plane of the concentrating table 15. For other types of ore the top edges of the riffle segments may be disposed in planes in which those planes adjacent the head end of the table form a greater angle with the plane of the table than the planes including edges of riffle segments adjacent the discharge end of the table. The variation or change in the angles of the top edges of the riffle segments 44 throughout the length of one riffle means depends upon the difference in densities of the particles of valuable mineral and the particles of waste in the crushed ore being separated and the general characteristics of the valuable mineral being processed.

It will be noted that each riffle segment 44 (Fig. 4) is slightly diagonally disposed across the top edge of the beveled riffle support members 41. The support members 41 are beveled at 48 and 49 on opposite sides of the base portions 45 of each riffle segment 44 to permit passage of upwardly directed currents of air through the fabric 42 closely adjacent to each riffle segment 44. The base portion 45 of each segment 44 corresponds with the top edges of the beveled surfaces 48 and 49 so that flow of air will take place immediately adjacent the upstanding vertical portion 46 as best seen in Fig. 5.

Means for supplying a current of low-pressure air is provided by a blower 50 mounted adjacent the head end of the table on the base 11. A duct 51 extends from the blower to a plurality of separate air chambers indicated by 52, 53 and 54 provided beneath the concentrating table 15. The air chambers 52, 53, and 54 may be of approximately the same volume, and independently controlled ducts (not shown) join the main supply duct 51 for providing communicating passages from the blower to the air chambers. The arrangement of the air chambers 52, 53 and 54 is such that a selectively controlled non-uniform flow of air through the fabric 42 is provided throughout the concentrating table area. The upwardly directed currents of air through the fabric 42 serve the purpose of fluffing agitating the particles of crushed ore supported on the fabric 42.

Extending between the spaced riffle means and at the junction of each riffle segment with the adjacent riffle segments are a plurality of angularly disposed vertical gate means 55 forming in effect spaced transversely disposed riffle means intersecting the longitudinal riffle means 43. The selected angle at which gate means 55 are disposed with respect to the longitudinal axis of the table is correlated in general to the normal angle of flow of the material across the table. The flow angle of the material is dependent upon several conditions, such as the oscillation frequency of the table, the length of stroke, the inclination of the table, the selected air pressures being employed in the several air chambers, the amount of mineral contained in the particles of the crushed ore, and the specific gravity differential between the valuable mineral and the gangue. Preferably, the gates are disposed at an angle slightly less than the normal flow angle of the material as determined by the preselected conditions of operation indicated above. Positioning of the gates at such an angle will cause the buffeted particles of material to move slightly backwardly and downwardly toward the "tailing" side of the deck. Obviously the conditions of operation noted above may be modified during the separation process to obtain maximum efficiency for separation of the mineral with respect to a selected angular disposition of the gate means.

Each gate 55 may be pivotally secured at 56 about an axis parallel to the deck in any suitable manner to an upstanding gate support member 57 formed as an integral part of the upper end of each riffle segment 44. The hinged or pivotal connection 56 is provided adjacent the upper end of the gate support 57 for permitting movement of the gate 55 about said pivotal connection to provide a generally triangularly shaped passage or opening between the lower edge of the gate 55 and the deck 15. The triangularly shaped opening is exemplary only since with some types of minerals it may be advantageous to employ a gate having a lower edge slightly curved throughout its length or having a virtually straight lower edge, except for a small notch at its unpivoted end adjacent its next lower riffle means as illustrated in Fig. 7. The selected profile of the lower edge of the gate depends upon the fraction planes of the mineral ore being processed and upon the desired weight of concentrate.

It should be noted that gate means 55 may be supported from the table in any suitable manner and it is not intended that this invention be limited by the manner of supporting the gate means 55 from the gate support member 57 integrally formed as part of the riffle segment. The gate support member may be separately secured to the beveled riffle support member and may comprise any suitable upstanding member adapted to afford a pivotal connection adjacent its top for the gate means 55.

Each gate 55 may be made of any suitable sheet material such as metal, plastic, pressure paper, and is made relatively high as compared to the height of the riffle segment 44 at its head end. At the end of the gate opposite the pivotal connection 56 a horizontal tab 58 is provided for manipulating the gate to permit adjustment of the triangularly shaped opening between the gate and the deck. It will be noted that the gate 55 slightly overlaps the transversely adjacent gate support member 57. The gates 55 are held in desired adjusted position by the frictional contact of its pivotal connection 56 and by pressure of the particles of crushed ore which bear against the gate 55 in their movement toward the discharge end of the table.

The gate means 55 is illustrated as being substantially rectangular in shape with the exception of an arcuate or curved lower corner adjacent the gate support member and beneath the pivotal connection 56. The arcuate portion is of such shape as to permit rotation of the gate about the pivotal connection 56 while maintaining the lower corner of the gate means 55 beneath the pivotal connection closely adjacent to the fabric 42 when the gate is adjustably positioned.

It will be readily apparent that the gate means 55 are each individually adjustable along the length of passage provided between adjacent longitudinal extending riffle means. The several gates may be variably adjusted as to the triangularly shaped opening made with the table in order to provide maximum efficiency in the separation of the heavier particles from the lighter particles of crushed ore. Generally the gates are positioned so that the opening between the gate and the deck adjacent the lower riffle segment is approximately the height of the top of the layer of high specific gravity material caught behind the next lower transversely spaced riffle segment. In some instances, all the gates controlling the passageway between two adjacent riffle means may be set in virtually the same position. In other instances, depending upon the characteristics of the crushed ore being processed, it may be desirable to adjust the gates near the head end of the table for a larger opening than the gates provided adjacent the foot end of the table.

In operation, ore which has been crushed and screened to the desired size is fed to the inclined concentrating or separating table at the upper corner formed by sides 35 and 37 by means of a controlled gravity feed from a storage hopper (not shown) through a discharge duct 16. As the crushed ore is fed to the concentrating table 15, the table is rapidly agitated by the eccentric connection at 31 in a longitudinal reciprocal movement. At the end of each reciprocal stroke the concentrating table is caused to rise slightly because of the cant in the legs 16 and 17 and the table is brought forcibly against the resilient block 27 so as to give the table a distinct and soft jar as the force is expended against the bumper post 26. The length of stroke of the longitudinal reciprocal movement of the table is regulated by adjustment of the nuts 28 and the coil spring 29 interposed therebetween. It is also understood that the concentrating table 15 is inclined to a suitable angle as indicated in Fig. 3 dependent upon the type of crushed ore being processed. In inclined position, although each entire riffle means is disposed vertually horizontal, each riffle segment 44 slopes upwardly toward the discharge end of the deck because of their echelon or obliquely offset arrangement.

As the particles of crushed ore contact the table deck beneath the discharge duct 60 the agitating motion of the table imparts a movement of the particles of crushed ore which normally causes them to move in a path of travel longitudinally of the table deck. The crushed ore contains particles of widely varying densities, for example, from particles of heaviest density comprising only the valuable mineral being separated to particles of least density comprising particles wholly composed of gangue or waste and between these two extremities there are numerous particles of varying densities composed partly of mineral and partly of gangue.

To best describe the action of the particles of crushed ore on the concentrating deck the path of a particle of heavier density will be first noted as illustrated in the drawing in Fig. 1 by solid arrows. Since the heavier particles have a tendency with agitation of the table to move transversely of the table because of gravitational forces, the heavier particles when agitated will tend to move against the riffle segments 44 and hug the upper side of the riffle segments rather closely. Because of the inclined position of the deck, the path of movement of the heavier particles along each riffle segment is upward. At the end of each segment the heavier particles drop to the next segment and again begin another uphill climb. Thus the heavier particles are subjected to a series of uphill climbs and abrupt drops throughout the length of the riffle means 43 in their path of travel toward the discharge end. This abrupt drop serves to agitate and jar the mass of heavier particles for loosening any lighter particles which may be held within the heavier mass. The series of uphill climbs tends to restrain flow of the heavier particles by forcing the heavier particles to climb a fraction of an inch in the length of each segment. Lighter particles of material do not climb as readily as the heavier particles and are aided by the inclination of each riffle segment in their rise to the top of the mass for jumping a riffle segment.

Since the segments 44 are tapered, as the heavier particles build up against the upper side of the segment, of which the somewhat lighter particles will tend to rise to the top first, the tapered riffle segments 44 cause an immediate repetitive successively acting separation of heavier particles from slightly lighter particles. The heavier particles move more rapidly toward the discharge end of the table as the table is agitated, and the amount that is permitted to move along a particular riffle means is controlled or regulated by the height to which the gates 55 are adjusted between two parallel riffle means. Since the gate provides a triangularly shaped opening with respect to the deck in which the high side of the opening is adjacent the lower riffle means, the heavier particles are permitted to pass through the gate opening while the somewhat lighter particles are stopped by the gate and tend to build up against the gate and then move or jump across the lower adjacent riffle segment. It will be readily evident that a continuous successive separation process of the very heaviest particles from the somewhat lighter particles is carried on through the entire length of the riffle means because of the provision of a plurality of separately tapered obliquely offset riffle segments and a plurality of gates 55 obstructing the passage of the particles longitudinally between the spaced riffle means. It will thus be noted that the heaviest particles will travel in a series of climbs and drops virtually parallel to the longitudinal axis of the table deck and be discharged near the upper end of the discharge side 38. Particles of slightly less weight which have been caused to jump or pass over several riffle means because of the obstructions formed by the gates will be discharged slightly lower on the discharge side 38.

The path of a relatively light-weight particle of waste is different from that of a heavier particle and is illustrated as arrows made of dashes. A light-weight particle due to the agitation of the crushed ore by the table and upward current of air tends to rise to the top of a mass of particles which are composed of different densities. As the light-weight particles rise to the top and are imparted movement in a longitudinal direction by agitation of the table they tend to build up against the gates 55. Since the maximum opening in the gate is adjacent the lower riffle means the lighter particles are kept from passing therethrough by the heavier particles. As the lighter particles build up against each gate 55 which are made of relatively great height as compared to the height of the riffle segments to permit a maximum building up of the lighter particles, the lighter particles are further affected by the current of air which is passing upwardly through the fabric 42. The action of the air and the agitation of the table particularly the jar at the end of each stroke create a motion in the mass of built-up particles against the gate which resembles that of a wave which progresses against the movement of the particles and towards the head side of the table. This wave motion aids greatly in effecting separation of the lighter particles from the heavier particles.

Since the gates are disposed at a selected angle with respect to the longitudinally extending riffle means dependent upon characteristics of material being processed, as the lighter particles are bounced or buffeted against the gates, the angular arrangement of the gates causes the lighter particles to be deflected virtually transversely of the longitudinal axis of the concentrating table. This deflecting action of the gates tends to rapidly separate and move the light-weight particles transversely of the table deck and toward the lower side 36 over which they are discharged as "tailings." Because of this arrangement of the gates the very light-weight particles will rapidly travel transversely of the table deck. Flow of material across the deck in a longitudinal direction is thus obstructed by a series of uphill climbs provided by the obliquely offset riffle segments in each riffle means and by the plurality of gates. These gates in effect act as a transverse riffle, particularly as to the lighter particles, and selectively pass only the heavier particles of the mass built up against the gates. Thus the lighter particles are forced to jump a riffle segment into the passageway between the next pair of lower riffle segments every few inches.

The provision of a plurality of independently controlled air pressure chambers affords means whereby the upwardly directed flow of air through the pervious fabric may be varied in different areas of the separating table. The controllable variation in air pressure in different chambers is important in providing an efficient separation process and also eliminates expensive, close preliminary screening of the ore. For example, the air pressure in the chamber adjacent the head end of the table may be selected so that it will move substantially all the sizes of particles of material lying on that portion of the table. If the pressure were the same throughout the entire area of the table, the lighter and finer particles, that is those particles just above the finer limitation of the screening range, could be moved entirely off the table and therefore lost. To obviate this condition, the air pressure in the second intermediate chamber is reduced below the pressure of the first chamber and, likewise, the air pressure in the chamber adjacent the discharge end of the table is reduced below that of the second or intermediate chamber. Thus the progressive, stepped-down air pressure from the material introducing side of the table to the discharge side of the table provides a variation of fluffing agitation acting on particles of material throughout the length of the table, and thereby facilitates efficient separation of the valuable mineral from gangue and particles of high specific gravity from low specific gravity. The valuable mineral in particles of sizes immediately adjacent the selected screening limits of the crushed ore are thus separated from the sifted material. The progressive reduction of air pressure throughout the length of the separating table also permits treatment of material particles having a broader range of size.

Obviously the number of air chambers provided beneath the pervious deck may be varied and it may be desirable to employ a large number of air pressure chambers or cells beneath the deck arranged so that a variation in air pressure may be obtained both longitudinally and transversely of the table.

Between the two extreme paths of the heaviest particles and the lightest particles described above, other particles having weights between these extreme weights will travel generally longitudinally and then transversely across the table until they are discharged along the discharge side 38 and "tailings" side 36 in accordance with their specific gravity. The concentrating table above described is highly efficient as will be readily understood by those skilled in the art because of the fact that the particles of crushed ore are subjected to a continuous positive separating process caused by the plurality of individual tapered segments in each riffle means and by the plurality of gates 55 which control the amount of heavier particles which can pass longitudinally along the riffle means and at the same time positively urge the lighter particles toward the "tailing" side of the deck.

As briefly mentioned above, the height of the tapered riffle segments, the variation in angle of the top edges of the segments with the plane of the table deck and the height of the gate means is dependent upon the particular characteristics of the mineral being separated. When the concentrating table is riffled for separation of ore in which the valuable mineral is of low weight ratio to the gangue, such as gold ore, the angle which the top edges of the riffle segments make with the table deck is substantially decreased toward the foot or discharge end of the table and the general over-all height of the riffle segments are not very great so that the separation process is not excessive, or, in other words, so that a finer degree of separation between particles of slightly varying densities is obtained.

Where the weight ratio between valuable mineral and gangue is high, as for example lead ore, because the crushed ore is of such a relatively large volume and weight, a change in the angle of the top edges of the riffle segments as the segments approach the discharge end of the table will not greatly affect the separation process. However, the height of the riffle segment is important when processing lead ore and should be relatively great as compared with the height of riffle segments as used in separating gold ore.

It should also be noted that with respect to some types of ore it may be desirable to increase the height of the riffle segments in the riffle means adjacent the "tailings" side 36 of the concentrating table as compared to the height of the riffle segments adjacent the upper or material-introducing end of the able. Such an arrangement would be preferable when the valuable mineral being separated is of lesser specific gravity than the gangue or waste mineral as for example in the case of graphite and mica.

The difference in specific gravity between the valuable mineral and the gangue mineral must be considered in connection with the height of the riffle segments and the angle which their top edges make with the deck. Where the difference in specific gravity is relatively great a high riffle can be advantageously utilized but where the difference is slight a relatively low riffle is more desirable; as for example, in the separation of antimony minerals from iron minerals.

It will be apparent to those skilled in the art that a novel separating table has been provided for processing valuable minerals whereby adjustments may be readily made in the frequency of oscillation of the separating table, the length of stroke, the inclination of the deck, the control of selected air pressures in various air chambers, the rate of feed, and the gates for bringing about a highly efficient and effective separating process which can most closely conform to the characteristics of the particles of combined mineral and gangue.

It should also be noted that there are variations within the particular type of crushed ore being separated in that the crushed ore will vary in richness from time to time. Usually the provision of the relatively high gates as compared to the riffle segments will compensate for such variables within the particular kind of ore for which the concentrating table was riffled.

A different arrangement of the tapered riffle segments and gates provided on the concentrating table is illustrated in Figs. 7 and 8. It will be noted in Fig. 7 that the riffle means 43' include a plurality of separately tapered individual riffle segments 44'. The segments 44' are secured to the beveled riffle support members 44 as by nailing in the previous modification and are arranged in longitudinally staggered relationship with each other so that the head end of one segment 44' is located at a point centrally intermediate the ends of the adjacent parallelly arranged segment. It should also be noted that each segment 44' is diagonally mounted across the top edge of the beveled riffle support member so as to provide a slightly echelon tandem arrangement in each riffle means 43'.

The gate means 55' may be secured as in the previous modification to an upstanding gate support member 57' formed in any suitable manner or as an integral part of the riffle segment as described above. The gate means 55' is of generally rectangular shape and is pivotally connected in any suitable manner at 56' to the support member 57'.

It will be noted that because of the off-set or staggered alternate arrangement of the segments 44' the gate means 55' project across the passageway between two adjacent riffle means and may rest on the adjacent off-set segment 44' at a point intermediate the ends thereof. It will thus be noted that in this arrangement even the heavier particles of valuable mineral are forced to climb a short distance as they pile up against the gate means 55' and ride over or jump over the lower segment 44'.

In the modification shown in Figs. 7 and 8 the gate means 55' is of a slightly different configuration than that shown in the above description. Gate means 55' is provided with a bottom edge having a portion 71 lying substantially parallel to the top edge of the gate, and adjacent the outer portion of the gate the lower edge may be relatively sharply or acutely notched as at 72. The notch 72 provides a generally triangularly shaped opening between the gate, adjacent segment, and deck which extends only a relatively short distance toward the adjacent higher segment and provides only a small opening immediately adjacent to the lower segment 44'.

This modification of the gate means used in this invention may be employed in connection with the riffle arrangement shown in the first modification. The notched gate means 55' is preferably used when crushed gold ore is being processed or when a mineral having characteristics similar to that of gold is being processed.

The operation of a concentrating table arranged according to the modification shown in Figs. 7 and 8 is substantially similar to that in the first modification with the exception that the separation process is modified by the arrangement of the alternate off-set riffle segments and by the different position of gate means 55' with respect to the lower adjacent segment.

The operation of the gates in the separation process should be particularly noted because the provision of a triangularly shaped passage for particles of heavier density which can be controlled or adjusted as to the amount of particles permitted to travel along one riffle means brings about a highly efficient and effective immediate separation of the heaviest particles from those of lighter weight. The action of the gates with respect to the lighter particles should also be particularly noted because their relatively great height as compared with the riffle segments permits a building up of particles against the gate so that the gate at the end of each stroke acts to buffet the lighter particles and urge them in a direction transverse to the normal path of travel of the heavier particles. It will be readily seen that an efficient and effective process of separation of the particles according to their specific gravity is thus accomplished over substantially the entire area of the deck.

While the concentrating table is illustrated as being of trapezoidal shape, the shape of the deck may be changed or modified as desired. It has been found, however, that the arrangement of the trapezoidal concentrating table described above is particularly suitable for processing most valuable minerals and the area of the concentrating table is most effectively utilized.

It is understood, of course, that the particles of crushed ore will be discharged from the foot end of the concentrating table extending from the upper side 35 to the lower side 36 in an order corresponding with the specific gravities of the particles. Troughs or take-off ducts may be arranged along the foot end of the table to collect and separate the various particles according to their densities, likewise take-off troughs may be provided along the lower side 36 for collecting the particles of gangue mineral or "tailings."

If desired, a dust hood may be superimposed over the concentrating table and spaced a distance therefrom in order to remove the dust generated by the agitation and fluffing of the particles of crushed ore. Although the dust hood is not illustrated in the drawings, it is contemplated that such a device would be used in connection with the concentrating table.

While the description of the above drawings is exemplary only of the modifications of this invention shown, it is readily understood by those skilled in the art that various other modifications may be made without departing from the scope of this invention which is intended to be limited only by the scope of the appended claims.

I claim:

1. In an apparatus for separating material of different specific gravities the combination of: a deck pivotally mounted on said frame and comprising a plurality of spaced longitudinally extending beveled support members and a pervious fabric extending across said members; means for oscillating said deck for imparting movement thereto in the direction of the longitudinal axis of said deck; means for directing a current of air through said pervious fabric from beneath said deck; riffle means spaced apart and extending longitudinally of said deck, each riffle means including a plurality of tapered obliquely offset riffle segments diminishing in size from the material-introducing end of the deck to the discharge end of said deck, said riffle segments having their top edges lying in parallel planes disposed at the same angle with the plane of the deck; and pivotally mounted adjustable gate means obstructing each passageway formed between transversely adjacent riffle segments for controlling quantity of material of higher specific gravities moved longitudinally in one path and for urging material of lesser specific gravities to move transversely of said deck.

2. In an apparatus for separating material of different specific gravities the combination of: a frame; a deck pivotally mounted on said frame and comprising a plurality of spaced longitudinally extending beveled support members and a pervious fabric extending across said members; means for oscillating said deck for imparting movement thereto in the direction of the longitudinal axis of said deck; means for directing a current of air through said pervious fabric from beneath said deck; riffle means spaced apart and extending longitudinally of said deck, each riffle means including a plurality of tapered obliquely disposed riffle segments diminishing in size from the material-introducing end of the deck to the discharge end of said deck, said riffle segments having their top edges lying in planes disposed at different angles with the plane of the deck; and a plurality of adjustable gate means obstructing each passageway formed between transversely riffle segments and adapted to present openings of varying depth for controlling passage therethrough of particles of heavy specific gravity.

3. In an apparatus for separating material of different specific gravities the combination of: a frame; a deck pivotally mounted on said frame and comprising a plurality of spaced longitudinally extending beveled support members and a pervious fabric extending across said members; means for oscillating said deck for imparting movement thereto in the direction of the longitudinal axis of said deck; means for directing a current of air through said pervious fabric from beneath said deck; riffle means spaced apart and extending longitudinally of said deck, each riffle means including a plurality of tapered riffle segments in echelon relation diminishing in size from the material-introducing end of the deck to the discharge end of said deck, each riffle segment having its upper edge lying in a plane disposed at a greater angle to the plane of the deck than the plane including points of greatest height in longitudinally adjacent riffle segments; and a plurality of adjustable gate means obstructing each passageway formed between transversely adjacent riffle segments and having a relatively great height as compared to the height of the tapered riffle segments.

4. In a concentrating table for separating material having particles of different characteristics, the combination of: a deck slightly inclined about its longitudinal axis and adapted to be agitated to impart movement to particles of material on said deck in predetermined directions; a plurality of spaced apart riffle means on said deck extending virtually parallel to said longitudinal axis and forming obstructions of varying height lying in parallel planes angularly disposed to the longitudinal axis of the deck for said particles within the length of each riffle means and a plurality of spaced apart gate means extending between adjacent riffle means and lying in planes intersecting said longitudinal axis at an angle.

5. A device of the character described above in claim 4 wherein each riffle means comprises a plurality of obliquely disposed segments of different height having top edges lying in spaced parallel planes inclined to the plane of the deck.

6. A device of the character described in claim 4 wherein each riffle means comprises a plurality of slightly obliquely disposed tapered segments decreasing in height from the material-introducing end of the deck to the discharge end of the deck, the taper of each segment being greater than the rate of decrease in height of said segments.

7. A device of the character described in claim 4 wherein each riffle means comprises separate tapered segments having top edges inclined to the plane of the deck in varying angles throughout the length of the riffle means.

8. A device of the character described in claim 4 wherein each gate means is pivoted adjacent one edge about an axis parallel to the deck for varying the opening between the bottom edge of said gate and the deck.

9. In a concentrating table for separating material having particles of different characteristics, the combination of: a pervious deck adapted to be agitated to impart movement to particles of material on said deck, a plurality of spaced apart parallel riffle means on said deck, each riffle means including a plurality of tapered segments each lying in a plane inclined to the longitudinal axis of the deck and a plurality of spaced apart gate means obstructing passageways defined between adjacent riffle means, said gate means being pivotally mounted for movement about axes disposed parallel to the deck.

10. An apparatus of the character described in claim 9 wherein the gate means may be pivotally adjusted to provide a triangularly shaped opening for said passageway.

11. An apparatus of the character described in claim 9 wherein the gate means are individually adjustable about their pivotal mountings for providing openings of varying size for controlling movement of particles along said passageway.

12. An apparatus of the character described in claim 9 wherein the gate means may be pivotally adjusted to provide a polygonal opening of varying size for said passageway, the gate means disposed along the passageway between adjacent riffle means being aligned with respect to the gate means disposed along an adjacent passageway.

13. A process for separating particles of material having different densities comprising the steps of: feeding the particles of material to a surface, agitating said particles to impart movement thereto in a predetermined direction, simultaneously fluffing the particles by upwardly directing a current of air through the material, successively obstructing gravitational movement of the heavier particles in their travel along a plurality of sequentially arranged upwardly inclined paths in the predetermined direction, selectively controlling the amount of heavier particles moved along each path, repetitively obstructing movement of the lighter particles in the predetermined direction and changing their path of travel to one virtually transverse to the predetermined direction, and producing a wave motion travelling against the predetermined direction among the particles by co-action of the upwardly directed air current and obstructing of the path of travel of the particles in the predetermined direction.

14. A process for separating particles of material having different densities comprising the steps of: feeding the particles of material to a surface, agitating said particles to impart movement thereto in a predetermined direction, simultaneously fluffing the particles by upwardly directing a current of air through the material, successively obstructing gravitational movement of the heavier particles in their travel along a series of upwardly inclined paths in the predetermined direction, selectively controlling the amount of heavier particles moved along each path, repetitively obstructing movement of the lighter particles in the predetermined direction and changing their path of travel to one virtually transverse to the predetermined direction.

15. A process for separating particles of material having different densities comprising the steps of: feeding the particles of material to a surface, agitating said particles to impart movement thereto in a predetermined direction, successively obstructing gravitational movement of the heavier particles in their travel along a series of upwardly inclined paths in the predetermined direction, selectively controlling the amount of heavier particles moved along each path, repetitively obstructing movement of the lighter particles in the predetermined direction and changing their path of travel to one virtually transverse to the predetermined direction.

16. In a concentrating table the combination of: a deck arranged to be agitated to impart movement to particles of material fed to said deck and adapted to be inclined about its longitudinal axis; means, including a plurality of tapered forwardly and upwardly inclined riffle segments disposed longitudinally in echelon tandem arrangement and transversely spaced to define longitudinally extending passageways; and means including a plurality of selectively positionable gates spaced along each passageway for obstructing longitudinal movement of said particles.

17. A concentrating table as defined in claim 16 wherein the forward end of each riffle segment is spaced above the adjacent end of the next forwardly disposed riffle segment for providing a series of climbs and falls for heavier particles of material as they move longitudinally of the deck.

18. A concentrating table as defined in claim 16 wherein each gate lies in a plane normal to the plane of the deck and is of relatively great height as compared to the forward ends of rearwardly adjacent riffle segments.

19. A process for separating particles of material having a different density comprising the steps of: feeding the particles of material to a surface; agitating said particles to impart movement thereto in a predetermined direction, obstructing gravitational movement of the heavier particles and movement of the heavier particles in the predetermined direction by subjecting said particles to a series of climbs and falls, selectively controlling the amount of heavier particles subjected to each fall, and obstructing movement of the lighter particles in the predetermined direction for changing their path of travel to one virtually transverse to the predetermined direction.

20. In a concentrating table for separating material having particles of different characteristics, the combination of: a deck adapted to be agitated to impart movement to particles of material on said deck, a plurality of spaced apart parallel riffle means on said deck, each riffle means including a plurality of tapered segments each lying in a plane inclined to the longitudinal axis of the deck, the riffle segments in one riffle means being longitudinally offset with respect to the riffle segments in an adjacent riffle means, and a plurality of spaced apart gate means obstructing passageways defined between adjacent riffle means, said gate means being pivotally mounted for movement about axes disposed parallel to the deck.

21. In a concentrating table for separating material having particles of different characteristics, the combination of: a deck adapted to be agitated to impart movement to particles of material on said deck, a plurality of spaced apart parallel riffle means on said deck each riffle mean including a plurality of tapered segments each lying in a plane inclined to the longitudinal axis of the deck, the riffle segments in one riffle means being longitudinally displaced with respect to the riffle segments in an adjacent riffle means, and means including a plurality of selectively positionable gates spaced along each passageway defined by said spaced riffle means for obstructing longitudinal movement of said particles.

22. A concentrating table as defined in claim 21 wherein the selectively positionable gates spaced along each passageway are longitudinally staggered with respect to the gate means disposed along an adjacent passageway.

PAUL R. YEWELL.

REFERENCES CITED

The following references are of record in the file of this patent:

UNITED STATES PATENTS

| Number | Name | Date |
| --- | --- | --- |
| 900,442 | Stebbins | Oct. 6, 1908 |
| 1,569,451 | Bonine | Jan. 12, 1926 |
| 1,648,285 | Stebbins | Nov. 8, 1927 |
| 1,710,521 | Sutton et al. | Apr. 23, 1929 |
| 1,923,917 | Davis | Aug. 22, 1933 |
| 2,163,332 | Sutton et al. | June 20, 1939 |